UNITED STATES PATENT OFFICE.

OLIVER M. NASH, OF EAST PEPPERELL, MASSACHUSETTS.

LAUNDRY GLOSS.

SPECIFICATION forming part of Letters Patent No. 715,844, dated December 16, 1902.

Application filed November 15, 1900. Serial No. 36,544. (No specimens.)

*To all whom it may concern:*

Be it known that I, OLIVER M. NASH, a citizen of the United States of America, and a resident of East Pepperell, county of Middlesex, Commonwealth of Massachusetts, have invented certain new and useful Improvements in Laundry Gloss, of which the following is a specification.

My invention relates to a preparation to be used in the process of laundering to give a gloss to starched articles when they are ironed.

It is desirable that certain articles of clothing, such as collars and cuffs, besides having stiffness should have a gloss or polish. While the main object of the use of starch is to give stiffness, starched goods may be polished by ironing; but a high gloss cannot easily be obtained with the use of starch alone.

My invention has for its object to provide a preparation by which laundered articles when treated by it may be easily given a high polish by ironing.

A further object of my invention is to provide a preparation which will prevent the iron from sticking to the goods treated by it and, further, one that will give smoothness and pliability to the laundered articles.

My invention consists, primarily, in a preparation made of a mixture of wax and stearic acid or saponified tallow.

It further consists in these two constituents mixed with others, which are added to attain more perfectly the chief object of my invention—that of high gloss—and the further objects above stated.

The wax above referred to may be either Japan wax, paraffin-wax, or any other suitable white wax which mixes well with stearic acid. I preferably use a mixture of Japan wax and paraffin-wax, although either one when mixed with stearic acid is sufficient when the laundered articles are treated with the mixture in proper proportions to give a high gloss when the goods are ironed. The Japan wax is a vegetable substance, and when mixed with stearic acid, (preferably that known as "double pressed,") which cuts the wax, in about the proportion of two pounds of Japan wax to one pound of stearic acid a preparation is produced that will go into perfect solution in the starch. It is desirable to add to this mixture of Japan wax and stearic acid in the proportions given a certain amount of paraffin-wax—say one and one-half pounds. This adds to the stiffness and assists in giving a gloss, and I have found the best results to be obtained by using a quality of paraffin-wax known as "135 test." I also find it desirable in producing smoothness and pliability, as well as to give a pleasant odor, to use a certain amount of an essential oil, and for this purpose I employ a few drops—say fifteen each—of the oils of lavender and sassafras. To obtain, further, more perfect pliability and to prevent the iron from sticking to the goods in ironing and polishing, I use a portion of glycerin—say one ounce—so the complete preparation as I preferably make it up consists of the following substances in the proportions indicated: two pounds Japan wax, one and one-half pounds paraffin-wax, one pound stearic acid, fifteen drops each of oils of lavender and sassafras, one ounce glycerin. These substances in the above proportions are melted together and then molded into cakes. The cakes are preferably molded in a form convenient for laundry use. In providing this preparation in solution rather than cakes, which may be preferred by large laundries, I add to the original formula eight ounces of borax and eight pounds of water. An emulsion is thus produced which has the same properties, but takes the form of an emulsion rather than a solid cake. When in form of a cake, it may be used with excellent results as an ironing-wax to rub on the iron to prevent sticking.

My preparation is applied as follows: When molded into cakes, the cakes are divided in such proportions by grooves that a certain proportion of each cake—say one-tenth—will be enough for an ordinary family laundering. This cake is dissolved in boiling water and then stirred into the starch or is dissolved directly in the starch, in case boiled starch is used. For cold starch mix with the starch in lukewarm water. The laundered goods are treated as with the ordinary starch, and when ironed they will be easily made to acquire a high gloss, owing to my preparation.

While I have described my preparation as containing the several ingredients above set forth in the proportions indicated, my invention is not limited to the use of all these ingredients nor to the use of them in the exact proportions given. The combination of a vegetable wax, preferably Japan wax, or of paraffin-wax, which is a mineral substance, with an animal wax or tallow, preferably stearic acid, which is a saponaceous tallow, comprises a preparation by which I attain one object of my invention. The mixture of both Japan and paraffin-wax and of the oils and glycerin and the combination of these various ingredients in the proportions stated contributes to produce a preparation by which I attain further and more perfectly the objects of my invention above set forth. Other oils may be used or they may be omitted entirely without destroying the essential features of my invention. Neither is glycerin essential in the broad idea which I desire to protect.

What I desire to secure by Letters Patent is—

1. A composition for use as a laundry gloss, composed of wax, stearic acid in the proportions substantially as described.

2. A composition for use as a laundry gloss, composed of Japan wax and stearic acid in the proportions substantially as described.

3. A laundry-gloss composition composed of Japan wax, paraffin-wax and stearic acid in the proportions substantially as described.

4. A laundry-gloss composition composed of Japan wax, paraffin-wax, stearic acid and an essential oil in the proportions substantially as described.

5. A laundry-gloss composition composed of Japan wax, paraffin-wax, stearic acid, oil of lavender, and oil of sassafras in the proportions substantially as described.

Signed by me at Worcester, Massachusetts, this 30th day of October, 1900.

OLIVER M. NASH.

Witnesses:
 ALDUS C. HIGGINS,
 WILLIAM H. GARLAND.